(12) United States Patent
Ragan (10) Patent No.: US 11,401,119 B2
(45) Date of Patent: Aug. 2, 2022

(54) MONORAIL TRAY CONVEYOR (71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 433 days.

(21) Appl. No.: 16/619,817

(22) PCT Filed: Apr. 27, 2018

(86) PCT No.: PCT/US2018/029924
§ 371 (c)(1),
(2) Date: Dec. 5, 2019

(87) PCT Pub. No.: WO2018/236469
PCT Pub. Date: Dec. 27, 2018

(65) Prior Publication Data
US 2020/0102161 A1    Apr. 2, 2020

Related U.S. Application Data

(60) Provisional application No. 62/521,936, filed on Jun. 19, 2017.

(51) Int. Cl.
*B65G 54/02* (2006.01)
*B60L 13/03* (2006.01)
*B65G 17/12* (2006.01)
*B65G 25/02* (2006.01)

(52) U.S. Cl.
CPC .............. *B65G 54/02* (2013.01); *B60L 13/03* (2013.01); *B65G 17/12* (2013.01); *B65G 25/02* (2013.01)

(58) Field of Classification Search
CPC ......... B60L 13/03; B65G 54/02; B65G 17/12; B65G 25/02; H02K 41/0356
USPC .................................................. 198/619, 805
See application file for complete search history.

(56) References Cited

U.S. PATENT DOCUMENTS

| | | |
|---|---|---|
| 3,625,181 A | 12/1971 | Weaver |
| 3,786,779 A | 1/1974 | Brunel et al. |
| 3,803,466 A | 4/1974 | Starkey |
| 3,806,979 A | 4/1974 | Bonami |
| 4,061,089 A | 12/1977 | Sawyer |

(Continued)

FOREIGN PATENT DOCUMENTS

| | | |
|---|---|---|
| CN | 103227552 A | 7/2013 |
| CN | 110550459 A | 12/2019 |

(Continued)

OTHER PUBLICATIONS

Extended European Search Report, European Patent Application No. 18820117.2, dated Feb. 16, 2021, European Patent Office, Munich, Germany.

*Primary Examiner* — James R Bidwell
(74) *Attorney, Agent, or Firm* — James T. Cronvich (57) ABSTRACT

A monorail tray conveyor in which a tray having magnets is driven along a single rail of a tray conveyor segment by stator coils housed in the rail. Carriage monorail segments including carriages that are driven along monorails have transfer rails that align with the rails of tray conveyor segments to transfer trays atop the carriage transfer rails between tray conveyor segments. The carriage monorail segments include horizontal translator segments, elevator segments, diverter segments, and filter segments.

29 Claims, 8 Drawing Sheets

(56) References Cited

U.S. PATENT DOCUMENTS

| | | |
|---|---|---|
| 4,418,907 A | 12/1983 | Shultz et al. |
| 4,613,805 A | 9/1986 | Matsuo et al. |
| 4,817,694 A * | 4/1989 | Matsuo .............. A61G 12/00 198/346.2 |
| 4,926,753 A * | 5/1990 | Weiss .................. B60L 15/005 104/118 |
| 5,156,093 A | 10/1992 | Azukizawa et al. |
| 5,299,662 A | 4/1994 | Reddy et al. |
| 5,473,992 A | 12/1995 | Takei |
| 5,528,113 A | 6/1996 | Boys et al. |
| 5,542,356 A | 8/1996 | Richert et al. |
| 5,626,080 A | 5/1997 | Trenner et al. |
| 5,664,660 A | 9/1997 | Prydtz et al. |
| 5,886,432 A | 3/1999 | Markle |
| 5,965,963 A | 10/1999 | Chitayat |
| 5,994,798 A | 11/1999 | Chitayat |
| 6,101,952 A | 8/2000 | Thornton et al. |
| 6,208,045 B1 | 3/2001 | Hazelton et al. |
| 6,274,952 B1 | 8/2001 | Chitayat |
| 6,279,728 B1 | 8/2001 | Jung et al. |
| 6,305,501 B1 | 10/2001 | Kahkipuro et al. |
| 6,397,990 B1 | 6/2002 | Brien et al. |
| 6,483,222 B2 | 11/2002 | Pelrine et al. |
| 6,499,701 B1 | 12/2002 | Thornton et al. |
| 6,531,793 B1 | 3/2003 | Frissen et al. |
| 6,578,495 B1 | 6/2003 | Yitts et al. |
| 6,580,185 B2 | 6/2003 | Kang et al. |
| 6,684,794 B2 | 2/2004 | Fiske et al. |
| 6,713,902 B2 | 3/2004 | Chitayat |
| 6,781,524 B1 | 8/2004 | Clark et al. |
| 6,803,681 B2 | 10/2004 | Faizullabhoy et al. |
| 6,879,063 B2 | 4/2005 | Frissen et al. |
| 6,917,136 B2 | 7/2005 | Thornton et al. |
| 6,971,507 B2 * | 12/2005 | Forman .............. B65G 21/2009 198/805 |
| 6,983,701 B2 | 1/2006 | Thornton et al. |
| 7,134,258 B2 | 11/2006 | Kalany et al. |
| 7,448,327 B2 | 11/2008 | Thornton et al. |
| 7,458,454 B2 | 12/2008 | Mendenhall |
| 7,511,250 B2 | 3/2009 | Lindig |
| 7,781,993 B1 | 8/2010 | Faizullabhoy et al. |
| 7,926,644 B2 | 4/2011 | Mendenhall |
| 7,948,122 B2 | 5/2011 | Compter et al. |
| 8,074,578 B2 | 12/2011 | Thornton |
| 8,076,803 B2 | 12/2011 | Jacobs |
| 8,333,274 B1 | 12/2012 | Lykkegaard |
| 8,347,789 B2 | 1/2013 | Wolf et al. |
| 8,616,134 B2 | 12/2013 | King et al. |
| 8,863,669 B2 | 10/2014 | Young et al. |
| 8,919,950 B2 | 12/2014 | Veis |
| 8,967,051 B2 | 3/2015 | King et al. |
| 9,032,880 B2 | 5/2015 | King et al. |
| 9,045,183 B2 | 6/2015 | Laurence et al. |
| 9,150,116 B2 | 10/2015 | Matscheko et al. |
| 9,202,719 B2 | 12/2015 | Lu et al. |
| 9,260,210 B2 | 2/2016 | Jacobs et al. |
| 9,346,371 B2 | 5/2016 | King et al. |
| 9,611,107 B2 | 4/2017 | Wernersbach et al. |
| 9,685,849 B2 | 6/2017 | Lu et al. |
| 9,701,488 B2 | 7/2017 | Paweletz |
| 9,802,507 B2 | 10/2017 | Clark et al. |
| 10,557,534 B2 * | 2/2020 | Chung .................. H02K 7/06 |
| 2003/0217668 A1 | 11/2003 | Fiske et al. |
| 2006/0011093 A1 | 1/2006 | Jensen et al. |
| 2007/0283841 A1 | 12/2007 | Lopatinsky et al. |
| 2010/0031856 A1 | 2/2010 | Shoda et al. |
| 2010/0213031 A1 | 8/2010 | Krech et al. |
| 2010/0236445 A1 | 9/2010 | King et al. |
| 2011/0100252 A1 | 5/2011 | Fukukawa |
| 2013/0008336 A1 | 1/2013 | Young et al. |
| 2013/0180824 A1 | 7/2013 | Kleinikkink et al. |
| 2015/0048693 A1 | 2/2015 | Prüssmeier |
| 2015/0144462 A1 | 5/2015 | Weiss |
| 2015/0360581 A1 | 12/2015 | King et al. |
| 2016/0159585 A1 | 6/2016 | Wernersbach et al. |
| 2016/0229645 A1 | 8/2016 | Von Ehrenstein et al. |
| 2016/0325938 A1 | 11/2016 | King et al. |
| 2016/0380562 A1 | 12/2016 | Weber et al. |
| 2017/0050332 A1 | 2/2017 | Bauer et al. |
| 2017/0247201 A1 | 8/2017 | Prüssmeier |
| 2017/0331359 A1 | 11/2017 | Paweletz et al. |
| 2018/0323732 A1 | 11/2018 | Weber et al. |
| 2019/0002214 A1 | 1/2019 | Weber |

FOREIGN PATENT DOCUMENTS

| | | | |
|---|---|---|---|
| DE | 202014006420 U1 | 11/2015 | |
| GB | 2133757 B | 1/1987 | |
| JP | S62225107 A | 10/1987 | |
| JP | 2001204108 A | 7/2001 | |
| JP | 2004015894 A | 1/2004 | |
| JP | 2007200205 A | 8/2007 | |
| JP | 3155445 U | 11/2009 | |
| KR | 20110054176 A | 5/2011 | |
| KR | 20110073968 A | 6/2011 | |
| WO | 2019002214 A2 | 2/2004 | |
| WO | 2009083889 A1 | 7/2009 | |
| WO | 2010092473 A1 | 8/2010 | |
| WO | 2014059134 A1 | 4/2014 | |
| WO | 2015042409 A1 | 3/2015 | |
| WO | 2015/056847 * | 4/2015 | .............. B60L 13/04 |
| WO | 2016071062 A1 | 5/2016 | |
| WO | 2016096749 A1 | 6/2016 | |
| WO | 2016096850 A1 | 6/2016 | |
| WO | 2016096856 A1 | 6/2016 | |
| WO | 2016096910 A1 | 6/2016 | |

* cited by examiner

MONORAIL TRAY CONVEYOR

BACKGROUND

The invention relates generally to power-driven conveyors and in particular to monorail tray conveyors driven by linear motors.

Transport systems in which carriers driven by linear synchronous motors route individual carriers along various paths in a complex network of tracks are used to convey articles to selected destinations. An example of such a transport system is described in U.S. Pat. No. 8,967,051, "Transport System Powered by Short Block Linear Synchronous Motors and Switching Mechanism, to Nathaniel N. King et al. of Magnemotion, Inc., Devens, Mass., U.S.A., Mar. 3, 2015. These systems are not easy to clean. The housings of the linear-motor stators present large, flat, closed upper surfaces that collect grease and other food particles in food-processing applications. Unless properly cleaned, the surfaces can become contaminated with bacteria. And hard-to-access undercut surfaces in the transport system can harbor these bacteria.

SUMMARY

One version of a monorail conveyor embodying features of the invention comprises a tray and a tray conveyor segment that extends from a first end to a second end in a conveying direction. The tray conveyor segment includes a single rail housing a linear-motor stator that extends in the conveying direction along the length of the tray conveyor segment and produces a traveling electromagnetic wave along the length of the rail. The tray includes a top platform and a pair of side guides that extend downward from the top platform and define a slot in which the rail is received. Magnets in the side guides interact with the traveling electromagnetic wave produced by the linear-motor stator to create a propulsive force that propels the tray along the length of the rail.

In another aspect a monorail conveyor embodying features of the invention comprises a carrier and a carrier conveyor segment that extending from a first end to a second end in a conveying direction and includes a single rail having an upwardly convex top and two opposite outer sides extending downward from the upwardly convex top. The carrier includes a pair of downwardly extending side guides separated across an upwardly convex slot bounded by a top wall and facing side walls joined by the top wall. The rail is received in the slot with the side walls facing the outer sides of the rail. A linear-synchronous motor including a linear-motor stator housed in the rail and a linear-motor forcer housed in the carrier propels the carrier along the length of the rail.

In another aspect an endless monorail conveyor embodying features of the invention comprises two tray conveyor sections and two carriage conveyor sections. The tray conveyor sections are arranged in parallel and extend in length from first ends to second ends. Each tray conveyor section has a monorail and a linear-motor stator housed in the monorail. A tray has a slot receiving the monorails and a linear-motor forcer forming a linear motor with the linear-motor stator in the tray conveyor section to propel the tray along the monorails. A first carriage conveyor section extends perpendicular to the two tray conveyor sections between the first ends and a second carriage conveyor section extends perpendicular to the two tray conveyor sections between the second ends. The first and second carriage conveyor sections each have a monorail and a linear-motor stator housed in the monorail. A first carriage includes a slot receiving the monorail of the first carriage conveyor section, a linear-motor forcer forming a linear motor with the linear-motor stator in the first carriage conveyor section to propel the first carriage along the monorail of the first carriage conveyor section, and a monorail extending perpendicular to the first carriage conveyor section. A second carriage includes a slot receiving the monorail of the second carriage conveyor section, a linear-motor forcer forming a linear motor with the linear-motor stator in the second carriage conveyor section to propel the second carriage along the monorail of the second carriage conveyor section, and a monorail extending perpendicular to the second carriage conveyor section. The first carriage conveyor section transfers the tray on the monorail of the first carriage between the first ends of the two tray conveyor sections, and the second carriage conveyor section transfers the tray on the monorail of the second carriage between the second ends of the two tray conveyor sections.

DETAILED DESCRIPTION

Figure 1:
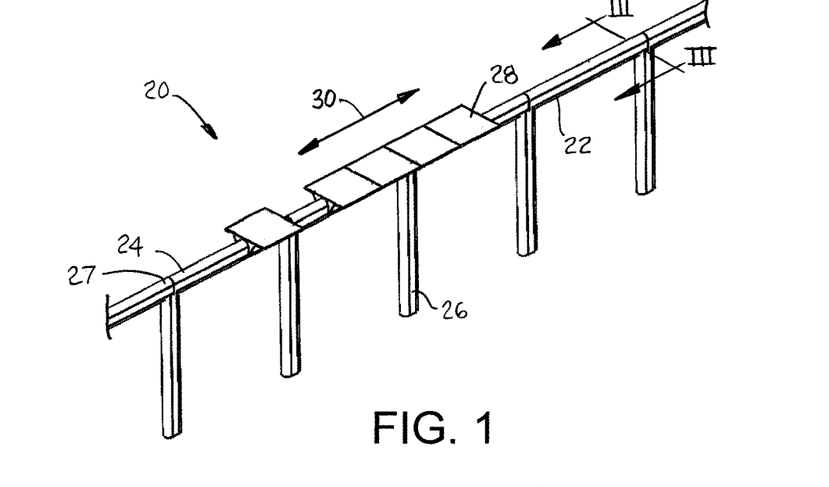
FIG. 1 is an isometric view of a series of tray conveyor segments forming a monorail tray conveyor embodying features of the invention.

A portion of a monorail tray conveyor embodying features of the invention is shown in FIG. 1. The tray conveyor 20 comprises a series of tray conveyor segments 22 with aligned monorails 24. Legs 26 are formed monolithically with the segments 22. Each segment 22 has a leg 26 at one end that extends past the butt end of the rail 24 and forms a flat ledge on which the legless end 27 of an adjacent segment sits. The bottom of the legless end is notched to mate with the flat ledge. Independently controllable trays 28 ride atop the monorail in a conveying direction 30. The rail 24 and the legs 26 are made of a nonferrous material such as a polymer material. The rail 24 and the legs 26 can be molded as one piece or made as separate pieces and sealed seamlessly into a monolithic segment.

Figure 2:
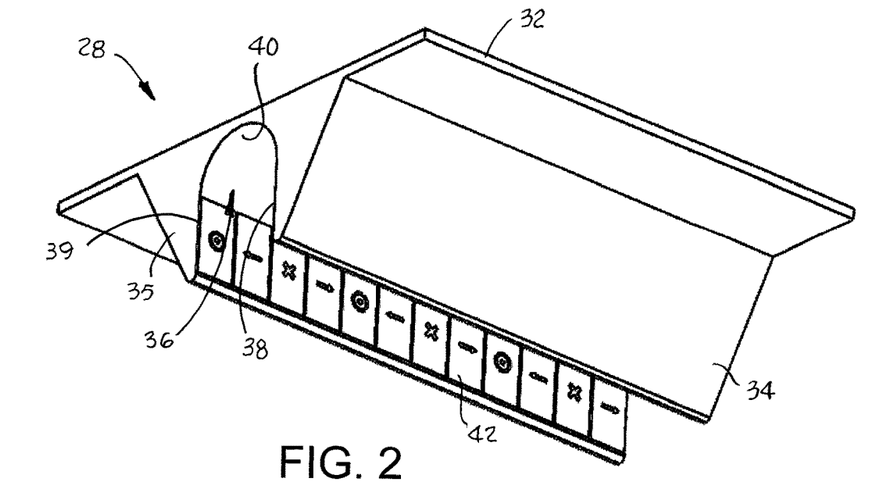
FIG. 2 is a bottom isometric view of a tray usable in a conveyor as in FIG. 1.

As shown in FIG. 2, the tray 28 has a top platform 32 for carrying conveyed articles. Side guides 34, 35 extend downward from the platform 32 and define a slot 36 between them. The slot 36 is shown bounded by a pair of facing flat side walls 38, 39 and a top wall 40 defining an inverted U. The top wall is shown as upwardly convex and curved, but it could be flat. The slot 36 extends the length of the tray 28 in the conveying direction. Magnets 42 in the side guides 34, 35 just inside the side walls 38, 39 extend the length of the tray 28. (The face of the left side wall 39 is removed in FIG. 2 to show the magnets 42.) In this version the magnets 42 are arranged in a Halbach array to concentrate the array's magnetic flux across the slot 36. But an array of alternating north and south poles could alternatively be used as tray magnets.

Figure 3:
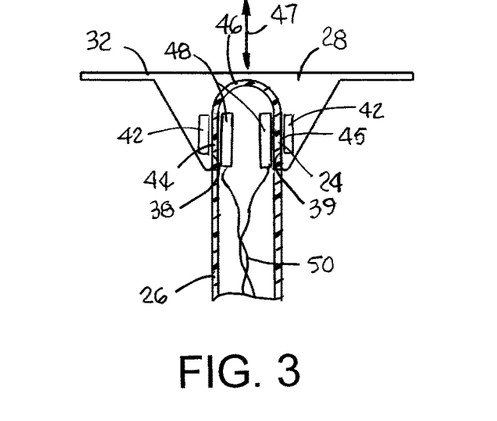
FIG. 3 is a cross sectional view of the conveyor of FIG. 1 viewed along line III-III.

The tray 28 rides on the tray conveyor rail 24 as shown in FIG. 3. The rail 24 has two opposite flat outer sides 44, 45 joined by an upwardly convex curved top 46. The shape of the slot 36 in the tray 28 is complementary with the shape of the upper portion of the rail 24 that includes the curved top 46 and the flat sides 44, 45. The flat walls 38, 39 of the tray's side guides 34, 35 extend down far enough to make the slot deep enough and close enough to the flat sides 44, 45 of the rail 24 to hold the tray 28 in place and prevent it from tilting off either side more than 5° about the conveying direction when carrying an uneven load or rounding a turn. But the tray 28 can be easily removed from or installed on the rail 24 vertically in the direction of the arrow 47. Housed in the rail 24 are a pair of stators 48 that extend along the length of the rail. The stators 48 form linear synchronous motors with the magnets 42 serving as linear-motor forcers in the trays 28. Wiring 50 providing power to the stators 48 and providing other electrical connections is also housed within the rails 24 and the legs 26. The rounded top 46 of the rail 24, which prevents fluids from pooling, and the sealed construction of the tray conveyor segments provide a sanitary conveyor.

Figure 4:
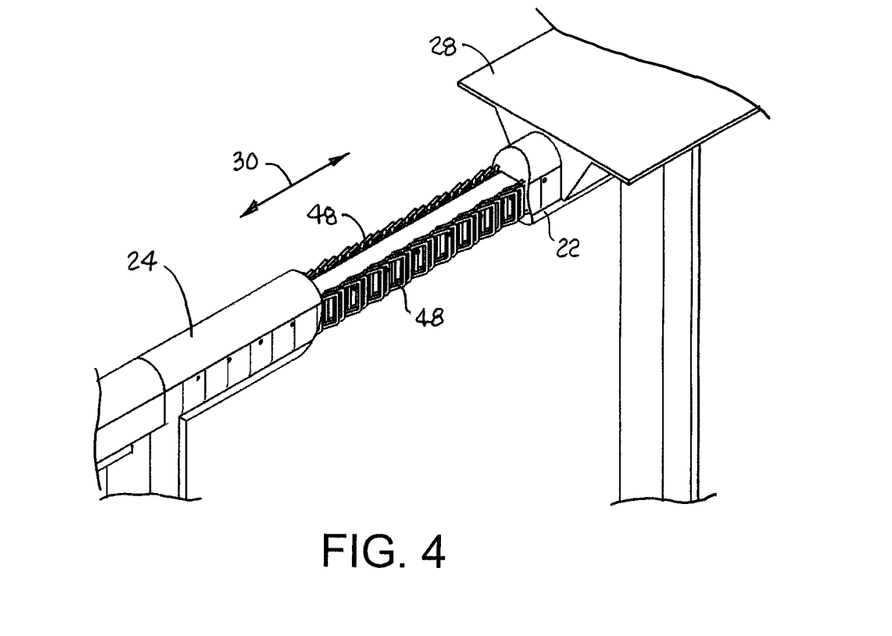
FIG. 4 is an enlarged isometric view, partly cut away, of one version of the conveyor of FIG. 1.
Figure 5:
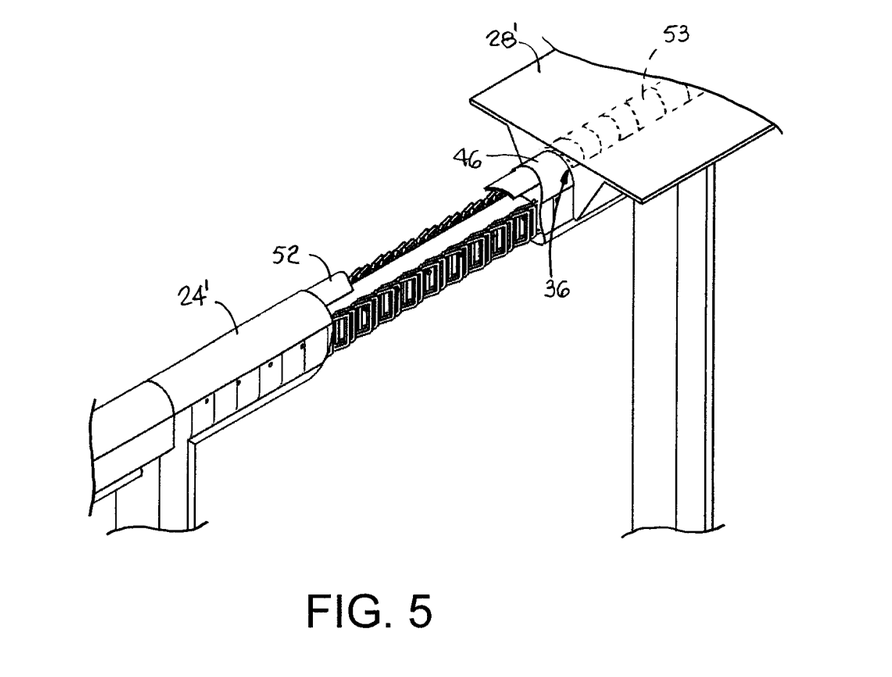
FIG. 5 is an enlarged isometric view, partly cut away, of another version of the conveyor of FIG. 1.

Further details of the monorail are shown in FIG. 4. Housed in the side walls 38, 39 of the rail 24 are the two stators 48. Each stator 48 comprises a series of three sets of coils mounted on core forms to form a three-phase stator that produces a magnetic flux wave that propagates along the length of the tray conveyor segment 22 in the conveying direction 30. The traveling magnetic flux wave interacts with the magnets in the tray 28 to produce a propulsive force in the conveying direction that propels the tray along the length of the rail 24. The stator cores can be ironless to prevent their attraction to the tray magnets, which would increase the frictional forces between the tray 28 and the rail 24. To further reduce friction, a rail 24' in FIG. 5 has electrically conductive material at the top 46 of the rail. The conductive material could be aluminum, copper, or carbon fibers molded into the rail 24' or a curved, nonferrous, electrically conductive plate or strip 52 housed just under the curved top 46 of the rail. The tray 28' includes magnet material, such as curved tray permanent magnets 53 mounted in the tray slightly above the top of the inverted U-shaped tray slot 36. The radius of the curved strip 52 is equal to or is slightly less than the radius of the curved magnets 53. The movement of the magnet material in tray 28' past the electrically conductive material in the rail induces eddy currents in the electrically conductive material that produce a secondary magnetic field that, in conjunction with the magnetic field of the magnet material in the tray, creates a levitational force against the tray 28' to reduce friction with the rail 24'. So, together, the magnet material and the electrically conductive material constitute a tray levitation system.

Figure 6:
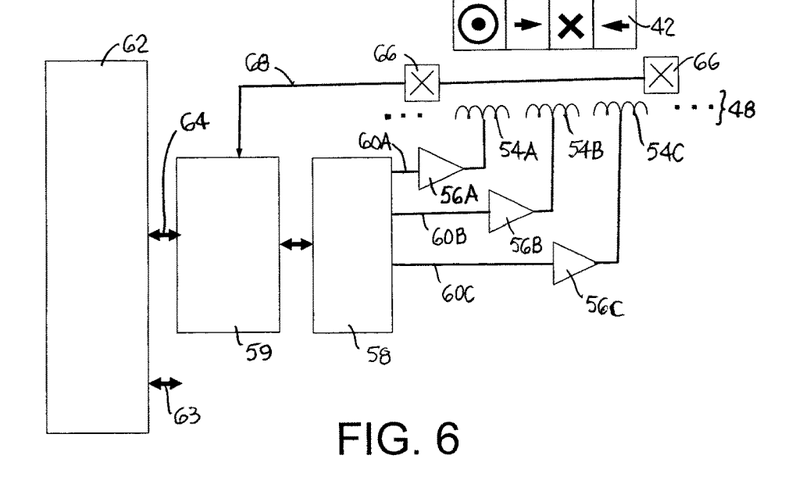
FIG. 6 is a schematic block diagram of the electrical and electronic system of the conveyor system of FIG. 1.

A block diagram of the tray conveyor electronics is shown in FIG. 6. The stator 48 comprises a linear series of three sets of coils 54A, 54B, 54C—one set for each of the three phases—alternately arranged along the length of the rail. Each set of coils 54A, 54B, 54C is driven by an amplifier 56A, 56B, 56C. The phasing sequence, which determines forward or reverse conveying direction, and the frequency of the stator 48 are controlled through a stator drive control 58, which sends coil control signals 60A, 60B, 60C to the amplifiers 56A, 56B, 56C. The stator drive control 58 is connected to a local stator drive computer 59 in communication with a remote system computer 62, which also communicates with the drive computers in other conveyor segments over a communication link 63. The stator drive computer 59 receives commands from and sends data to the system computer 62 wirelessly or over a hard-wired connection 64. Sensors 66, such as Hall-effect sensors mounted along the rail at sensor positions and sensitive to the tray magnets 42, send sensor signals 68 indicating the position of a conveyor tray over a sensor bus to the drive computer 59. The stator drive control 58 uses those signals to determine when to energize and de-energize the stator 48. All those components, except for the remote system computer 62, are encapsulated in the rail 24 or the leg 26 of the tray conveyor segment as in FIG. 3.

Figure 7:
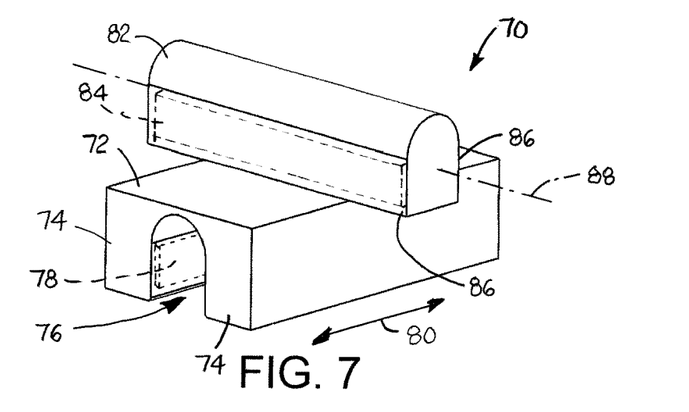
FIG. 7 is an isometric view of a translator carriage usable with a conveyor as in FIG. 1.

FIG. 7 shows a translator carriage 70 for translating trays horizontally from one tray conveyor section to another parallel section. (As used in this application, a tray or carriage conveyor section is made up of one or more tray or carriage conveyor sections.) The carriage 70 has a top carriage platform 72 and a pair of carriage side guides 74 that extend downward from the platform. The side guides are separated laterally across a carriage slot 76 that is shaped, for example, like the tray slot (36, FIG. 2). In that way the carriage 70 can ride on a monorail like that for the tray conveyor segments. Instead of permanent magnets as in the trays, carriage coils 78 are housed in the side guides 74. The three-phase carriage coils 78 form a linear-induction or switched-reluctance motor with the conveyor rail stator to propel the carriage 70 in the carriage translating direction 80. Mounted atop the carriage platform 72 is a transfer rail 82, which houses carriage drive coils 84 along its sides 86. The carriage drive coils 84 form a transfer-rail stator that propels trays along the transfer rail 82. The transfer rail 82 has a horizontal axis 88 that is perpendicular to the carriage translation direction 80. (As used in this application, the term perpendicular as applied to two lines means two intersecting lines whose direction vectors are orthogonal or two skew lines whose direction vectors are orthogonal.)

Figure 8:
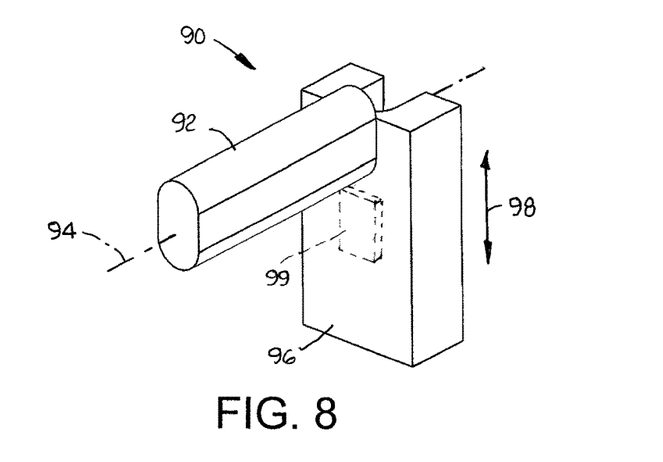
FIG. 8 is an isometric view of an elevator carriage usable with a conveyor as in FIG. 1.

An elevator carriage 90 is shown in FIG. 8. The elevator carriage 90 is electrically the same as the translator carriage (70, FIG. 7). They differ in structure in that the elevator carriage 90 has an elevator transfer rail 92 with a horizontal transfer axis 94 that is perpendicular to the plane of the top platform surface 96 and the vertical elevating direction 98.

Furthermore, the elevator carriage 90 contains ferrous cores or permanent magnets 99 attracted to the vertical rail 120 (FIG. 9A) of an elevator segment 106 to constrain its horizontal motion. Alternatively, horizontal motion of the elevator carriage 90 can be constrained with low-friction mechanical stops that encircle the vertical rail 120. And the vertical rail 120 for the elevator carriage 90 has a stator that contains a ferrous core to which the carriage is attracted.

Figure 9A:
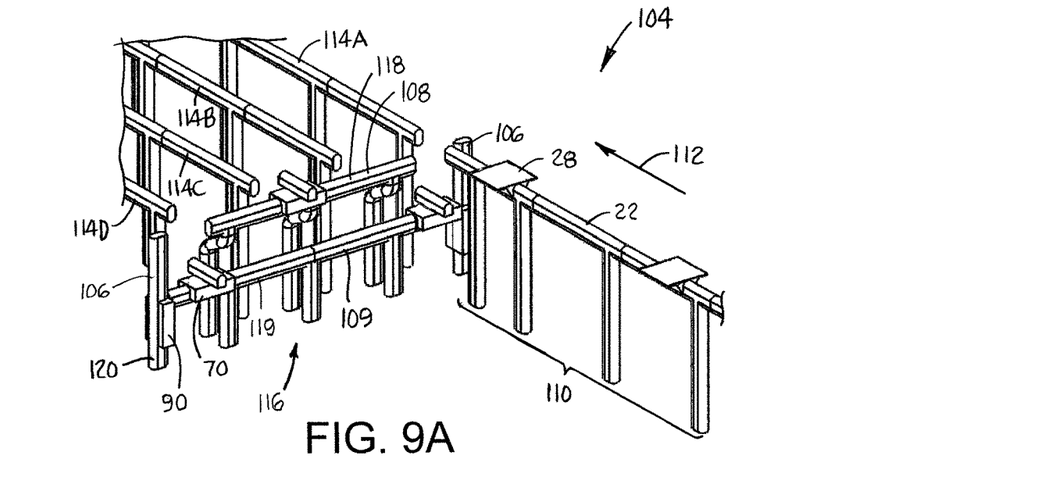
FIGS. 9A and 9B are isometric views of a sorter conveyor made with tray conveyor segments as in FIG. 1 and carriage conveyor segments.
Figure 9B:
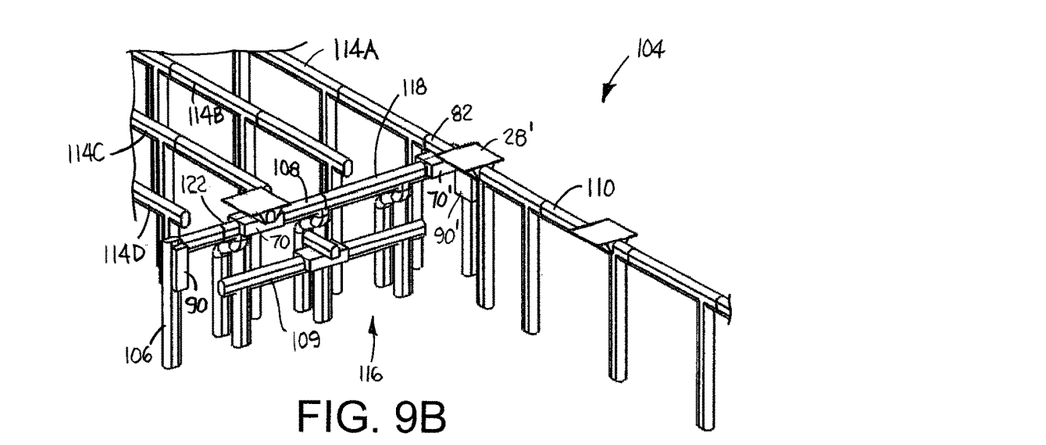

A monorail sorter 104 constructed of tray conveyor segments 22, elevator segments 106 with elevator carriages 90, and translator sections 108, 109 with translator carriages 70 is shown in FIGS. 9A and 9B. An infeed monorail section 110 advances trays 28 in a conveying direction 112 toward four parallel outfeed monorail sections 114A-D. A transfer monorail section 116 with return is positioned between the infeed monorail section 110 and the outfeed sections 114A-D. The transfer monorail section 116 is constructed of: (a) an upper translator rail section 108 whose rail 118 is at a level below the level of the infeed and outfeed monorails 110, 114A-D and perpendicular to the conveying direction 112; and (b) a lower translator rail section 109 whose rail 119 is parallel to and below the upper rail. The elevator segments 106 with vertical rails 120 are positioned at opposite ends of the transfer monorail section 116. Translator carriages 70 ride on the horizontal rails 118, 119 of the upper and lower translator sections 108, 109; an elevator carriage 90 rides on each of the two elevator segments 106.

As shown in FIG. 9B, a translator carriage 70' sits atop an elevator carriage 90' whose rail is in a raised position in line with the upper translator rail 118. With the elevator carriage 90' in that position, the transfer rail 82 of the translator carriage 70' is aligned with both the infeed monorail 110 and the outfeed monorail 104A to receive a tray 28' from the infeed monorail 110. If the tray 28' is to be sorted onto the first outfeed monorail 114A, the translator carriage 70' remains in its position until the tray transfers across onto the first outfeed monorail 114A. If the tray 28' is destined for another outfeed monorail 114B, C, or D, the upper translator section 108 propels the translator carriage 70' with the tray 28' into alignment with the selected outfeed monorail section. The translator carriage 70' is then activated to propel the tray 28' off onto the selected monorail section 114B, C, or D. Translator carriages 70 on the upper translator rail 118 that are not aligned with the infeed monorail 110 are propelled past the distal end 122 of the rail and onto the rail of a waiting elevator carriage 90 in its raised position. The elevator segment 106 then lowers the translator carriage 70 atop the elevator carriage to the lower translator section 109, which propels the translator carriage back to the elevator segment 90' at the other end. In this way the lower translator section 109 serves as a return for the translator carriages 70. And the elevator segments 90, 90' transfer the translator carriages 70 between the upper and lower translator sections 108, 109. By reversing the conveying direction 112, the same conveyor layout can be used as a merge conveyor that merges the flow of trays from the four monorail sections 114A-D onto the single monorail section 110. Or there could be multiple infeed monorails arranged in parallel to feed trays from multiple input tray conveyor sections to multiple output tray conveyor sections.

Figure 9C:
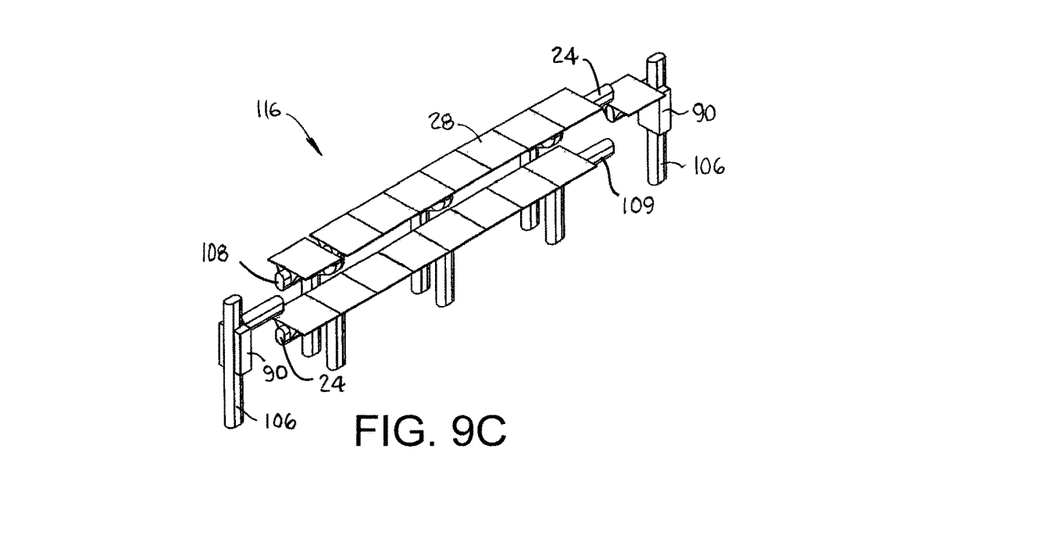
FIG. 9C is an isometric view of an expanded tray carryway-returnway as in FIGS. 9A and 9B carrying trays directly.

The transfer monorail section 116 of FIGS. 9A and 9B is shown as a stand-alone monorail tray conveyor in FIG. 9C. In this example trays 28 are carried directly on the rails of the coextensive upper and lower translator sections 108, 109 without translator carriages. The rails 24 of the upper and lower translator sections 108, 109 lie in the same vertical plane. The elevator segments 106 at each end transfer the trays 28 atop the rails of the elevator carriages 90 between the upper and lower monorail sections 108, 109 to form an endless tray conveyor with an upper carryway and a lower returnway. The upper and lower monorail sections 108, 109 can alternatively be positioned in the same horizontal plane in a racetrack configuration. In the racetrack configuration, horizontal translator segments using translator carriages as in FIG. 7 would be positioned perpendicular to the monorail sections 108, 109 at each end to replace the elevator carriage segments and transfer the trays 28 horizontally between the two monorail sections atop the translator carriages.

Figure 10:
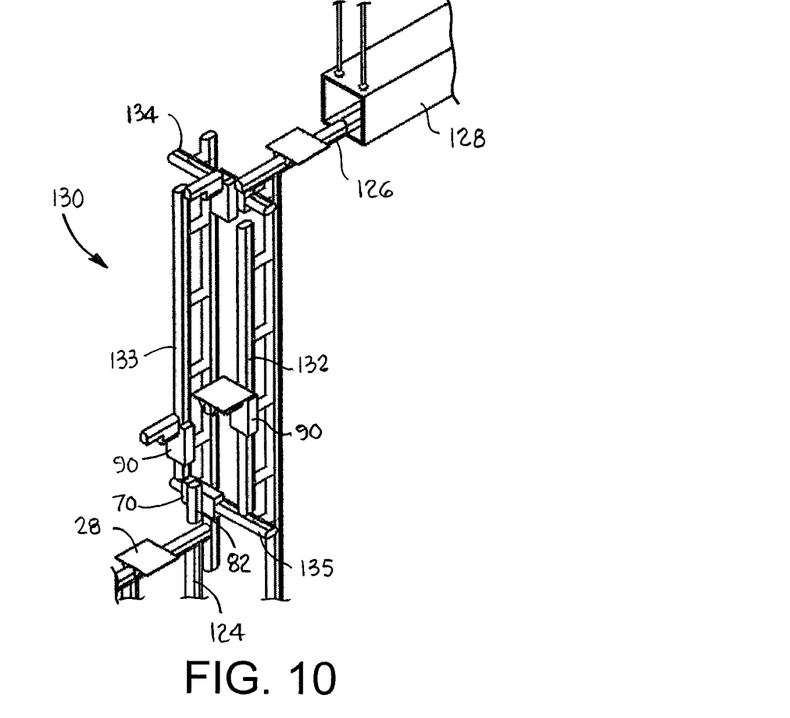
FIG. 10 is an isometric view of an elevator constructed of tray conveyor segments as in FIG. 1, translator carriage segments, and elevator carriage conveyor segments.

FIG. 10 shows a monorail tray conveyor in which trays 28 are raised or lowered from one level to another. In an elevator, a tray 28 on a lower infeed monorail section 124 is lifted to an outfeed monorail section 126 that extends through an overhead pipe 128. The elevator 130 includes an upgoing elevator segment 132 and a parallel downgoing elevator segment 133. Upper and lower translator segments 134, 135 bridge the elevator segments 132, 133 at opposite ends. To raise a tray 28 from the lower infeed section 124 to the upper outfeed section 126, a translator carriage 70 bearing an elevator carriage 90 aligns the rails of the elevator carriage with the rail of the infeed tray conveyor section. The tray 28 is then transferred onto the rail of the elevator carriage 90. Then the translator carriage 70 is moved along its rail until its transfer rail 82 is aligned with the rail of the upgoing elevator segment 132. The elevator carriage 90 carrying the tray 28 is lifted to the upper end of the elevator. The translator carriage 70 on the upper translator segment 134 is positioned with the carriage's transfer rail 82 in line with the upgoing elevator segment's rail to receive the elevator carriage 90 and the tray 28. The upper translator segment 134 then moves its carriage 70 with the elevator carriage 90 and the tray until the elevator carriage's rail aligns with the rail of the outfeed monorail section 126. The tray 28 is then propelled off the elevator rail and onto the outfeed conveyor rail and through the pipe 128. The upper translator segment 134 then moves the elevator carriage 90 to the downgoing elevator segment 133 to return the elevator carriage back to the lower translator segment 135 to receive another tray 28. The elevator 130 can be operated in reverse as a lowerator lowering trays 28 from the pipe 128 to the lower rail section 124.

Figure 11:
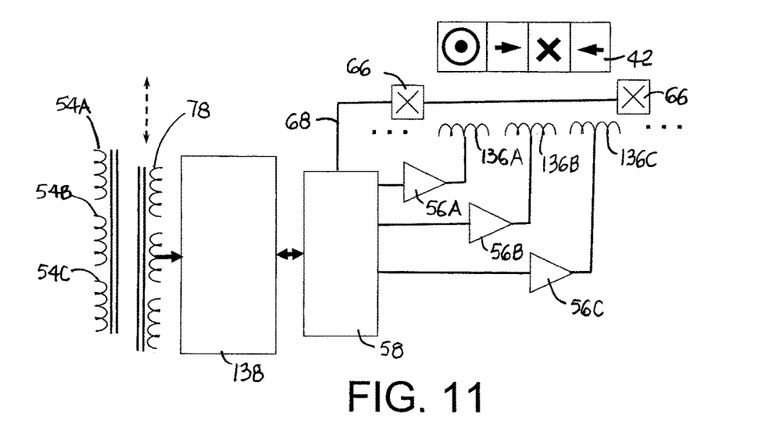
FIG. 11 is a schematic block diagram of the electrical and electronic system of a carriage conveyor segment in a conveyor as in FIG. 9A-9C or FIG. 10.

FIG. 11 is a block diagram of the control electronics and the electrical devices housed in the elevator and translator carriage segments. The carriage-rail stator drive system, including three-phase stator carriage-drive coils 136A-136C in the carriage's transfer rail, the coil-drive amplifiers 56A-56C, the carriage stator drive control 58, and the position sensors 66, is schematically the same as for the tray conveyor segments described with respect to FIG. 6. The stator drive-system components are distributed between the carriage rails and the carriage body. The output of the carriage coils 78 provides electrical power to the drive control 58, the amplifiers 56A-C, and the rail stators 136A-C to drive the carriage and to the position sensors 66. The carriage coils 78 receive power inductively from the carriage stator 54A-C in the carriage conveyor segment supporting the carriage.

Power-line communication, in which data on a high-frequency carrier is superposed on the ac power, is used to communicate data and control signals between the stator drive control 58 and the system computer. The position sensors 66 send sensor signals 68 to the carriage stator drive control 58. A power and communication system 138 in the carriage includes: (a) a filter section to separate the communication signals from the ac power; (b) a rectifier to convert the ac power into dc; (c) a voltage regulator regulating the dc voltage to power the carriage stator drive control 58; (d) a decoder to decode received communication signals; and (e) a modulator and line driver to transmit outgoing data messages including tray position data over the carriage coils 78. The stator drive control 58 processes the decoded incoming messages received from the power and communication system 138 and sends data messages to the power and communication system for transmission over the power system. The carriage coils 78 form a switched-reluctance or linear-induction motor with the carriage-rail stator 54A-C to move the carriage. When the carriage is stopped, the power from the carriage rail stator 54A-C is used to drive conveyor trays having magnets 42.

The trays, the translator carriages, and the elevator carriages are all carriers designed to ride on the same kind of conveyor segment. For example, the carriages can be run on tray conveyor segments, and the trays can be run on carriage conveyor segments. So tray conveyor segments and carriage segments are both carrier conveyor segments.

Figure 12:
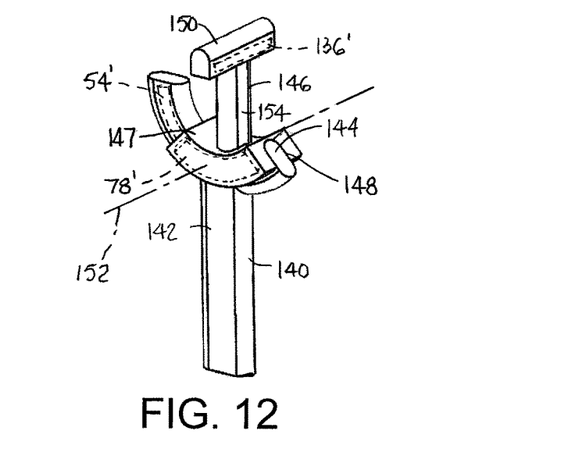
FIG. 12 is an isometric view of a tilter conveyor segment usable with tray conveyor segments as in FIG. 1.

A tilter carriage segment 140 for a monorail conveyor is shown in FIG. 12. The tilter segment 140 has a tilter base 142 that includes a curved, upwardly concave rail 144 housing a tilter stator that creates an electromagnetic wave that travels along the curved rail. A tilter carriage 146 has a platform 147 that rides on the rail 144. The tilter carriage 146 has a curved slot 148 that receives the curved rail supported on the tilter base 142. The tilter-rail stator drive system is electrically the same as that for the translator and elevator carriages shown in FIG. 11. Thus, the tilter carriage segment, like the translator carriage segment and the elevator carriage segment, is another version of a carriage segment. Tilter coils 78' are housed in the tilter carriage platform 147 to receive power and to send and receive communications to and from the stationary tilter stator 54' in the tilter base rail 144 by inductive coupling. The tilter stator 54' and the tilter coils 78' form a switched-reluctance or linear-induction motor that drives the tilter platform 147 along the curved rails, which tilts a tilter rail 150 over a range of tilt angles about a tilt axis 152 perpendicular to the plane of the base rail 144. The tilter rail 150 extends in length parallel to the tilt axis 152. Tilter drive coils in the tilter rail form a tilter stator 136' that is controlled by tilter coil-drive amplifiers housed in the rail 150 or a leg 154 joining the rail to the tilter platform 147. A tray on the tilter carriage rail 150 is propelled along by the tilter rail stator 136'.

Figure 13A:
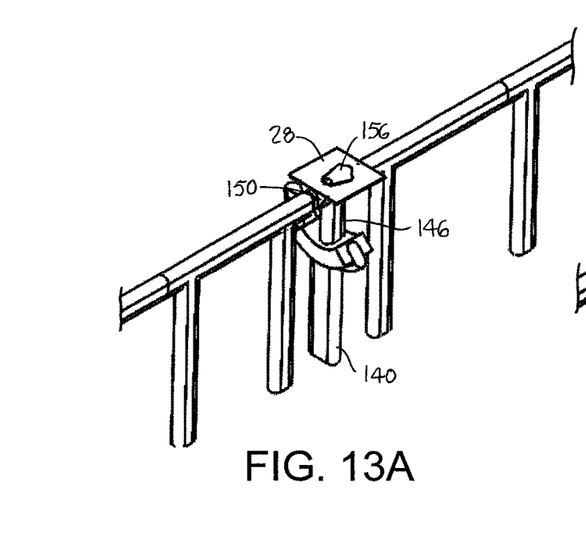
FIGS. 13A and 13B are isometric views of a tilter conveyor segment as in FIG. 12 in line with tray conveyor segments as in FIG. 1 in untilted and tilted orientations.
Figure 13B:
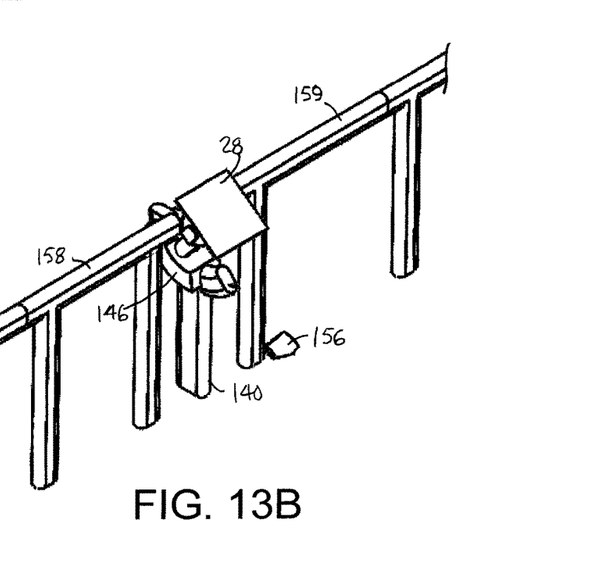

The tilter carriage segment 140 is shown in operation in FIGS. 13A and 13B. A tray 28 carrying an article 156 is received on the tilter carriage rail 150 in FIG. 13A. The tilter carriage 146 is set for a tilt angle of 0° (no tilt). If the article 156 is to be tilted off the tray 28, the curved tilter stator 54' drives the tilter carriage 146 to an angular position as in FIG. 13B sufficient to drop the article off the side of the conveyor. The tilter then is returned to the 0° position to be in position to receive the next tray 28 from the infeed monorail section 158. After being righted, the tray 28 on the tilter carriage is fed onto an outfeed monorail section 159.

Figure 14:
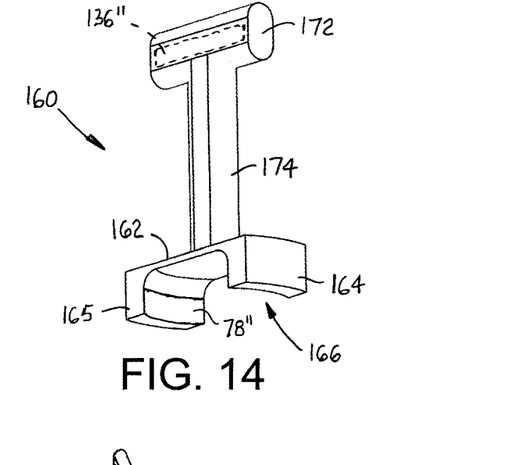
FIG. 14 is an isometric view of a diverter conveyor segment usable with tray conveyor segments as in FIG. 1.
Figures 15A, 15B:
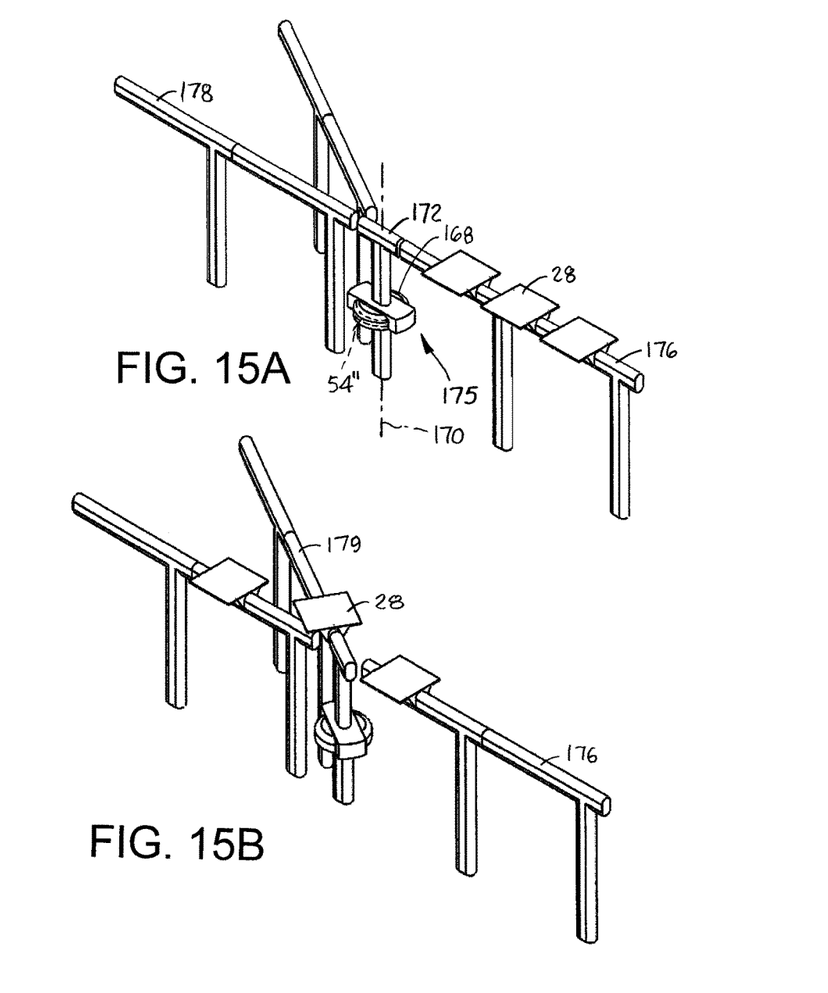
FIGS. 15A and 15B are isometric views of a diverter conveyor segment as in FIG. 14 forming a diverting conveyor with tray conveyor segments as in FIG. 1 shown in straight-through and diverting orientations.

FIG. 14 shows a diverter carriage 160 that includes a lower diverter platform 162 from which a pair of skirts 164, 165 depend. Each skirt 164, 165 houses diverter coils 78" arranged in a curve. A gap 166 between the skirts 164, 165 receives a circular diverter base 168 (FIG. 15A) that houses a linear-motor stator 54" just inside its periphery. The linear-motor stator 54" in the base 168 forms a switched-reluctance or linear-induction motor with the diverter coils 78" to rotate the diverter carriage 160 about a vertical axis 170. A diverter rail 172 is mounted to the diverter carriage platform 162 by a post 174. Diverter drive coils 136" in the diverter rail 172 drive the trays 28 along the rail. The electronic and electrical components housed in the diverter segment 175 are equivalent to those shown in FIG. 11 for the translator and elevator carriages and for the tilter carriage. Thus, the diverter carriage segment, like the translator carriage segment and the elevator carriage segment, is another version of a carriage segment. The diverter stator 54" in the base 168 rotates the diverter carriage 160 over a range of angles from an in-line position, in which the diverter rail 172 is aligned with the rail of an infeed tray conveyor section 176 and the rail of a first inline outfeed tray conveyor section 178 as in FIG. 15A, to a diverting position, in which the diverter rail is aligned with a second outfeed tray conveyor segment 179 oblique to the infeed and first outfeed tray conveyor segments as in FIG. 15B. The operation can be reversed to operate the conveyor as a merge conveyor merging trays 28 from the inline conveyor section 178 and the oblique conveyor section 179 into a single file on the conveyor section 176 operated as an outfeed conveyor section.

Figure 16:
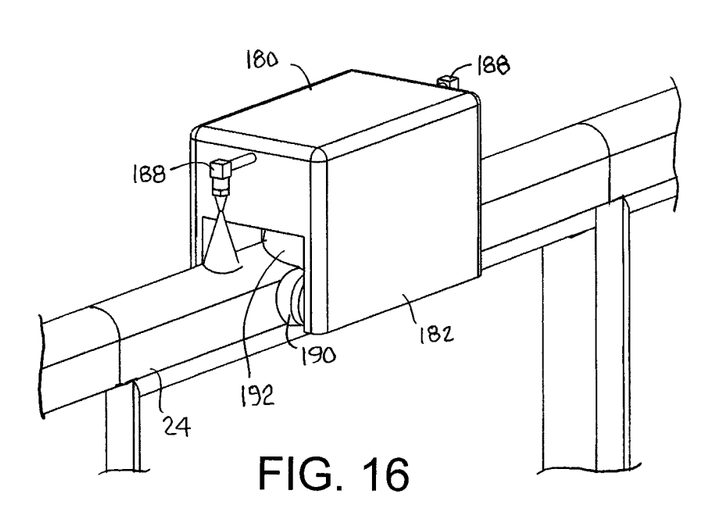
FIG. 16 is an isometric view of a monorail scrubber on a conveyor as in FIG. 1.
Figure 17:
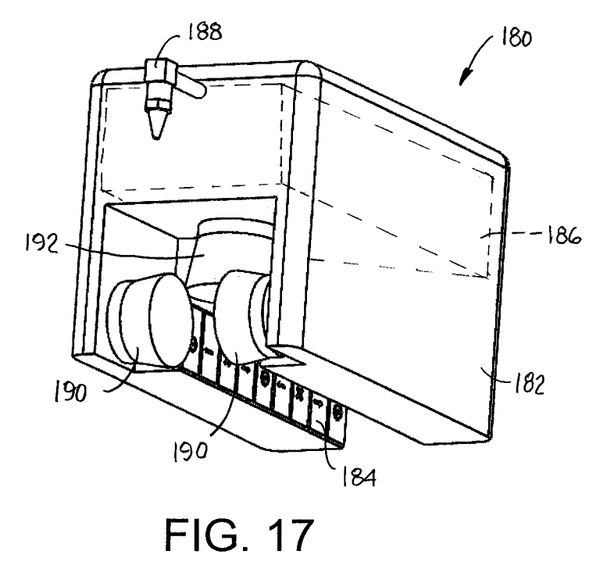
FIG. 17 is an axonometric view of the rail scrubber shown in FIG. 16.

A monorail scrubber 180 is shown in FIGS. 16 and 17. The scrubber 180 includes a scrubber body 182 that rides on a tray conveyor rail 24. An array of scrubber magnets 184 extends along the length of the scrubber body 182 to interact with the traveling magnetic wave produced by the rail stator. The interaction creates a propulsive force that propels the scrubber 180 along the rail 24. One or more tanks 186 in the scrubber body contains a cleaning fluid or a rinsing fluid dispensed onto the rail 24 by nozzles 188. Together, the tank and nozzle form a cleansing dispenser. Side brushes 190 scrub the sides of the rail 24. A top brush 192 scrubs the top of the rail 24. The dispenser could be powered by a battery (not shown) in the scrubber 180 or inductively from the rail stator via scrubber coils (not shown).

What is claimed is:

1. A monorail conveyor comprising:
   a tray conveyor segment extending from a first end to a second end in a conveying direction and including:
      a single rail housing a linear-motor stator extending in the conveying direction along the length of the tray conveyor segment to produce a traveling electromagnetic wave along the length of the rail;
   a tray including:
      a top platform;
      a pair of side guides extending downward from the top platform and defining a slot in which the rail is received;
      magnets in the side guides that interact with the traveling electromagnetic wave produced by the linear-motor stator to create a propulsive force that propels the tray along the length of the rail;
      wherein the top of the rail is convexly curved.

2. A monorail conveyor as in claim 1 wherein the tray conveyor segment includes:
   a leg monolithically formed with the rail for supporting the rail; and a controller housed in the leg for driving the linear-motor stator to produce the traveling electromagnetic wave.

3. A monorail conveyor as in claim 2 wherein the tray conveyor segment includes sensors at sensor positions in the rail sensing the presence of a tray at the sensor positions and sending sensor signals to the controller.

4. A monorail conveyor as in claim 1 wherein the linear-motor stator comprises three-phase coils to form a linear synchronous motor with the magnets in the tray.

5. A monorail conveyor as in claim 4 wherein the three-phase coils have ironless cores.

6. A monorail conveyor as in claim 1 wherein the slot is in the form of an inverted U.

7. A monorail conveyor as in claim 1 further comprising:
first and second tray conveyor segments whose rails are aligned across a gap;
a tilter carriage segment having a tilter base including an upwardly curved rail that houses a tilter stator creating a traveling electromagnetic wave along the curved rail;
a tilter carriage including:
  a tilter carriage platform having a curved slot that receives the curved rail supported on the tilter base and tilter coils housed in the tilter carriage platform along the curved slot;
  a single tilter rail supported above the tilter carriage platform in the gap;
  tilter drive coils housed in the tilter rail;
a tilter controller driving the tilter stator to produce a traveling electromagnetic wave that interacts with the tilter coils to tilt the tilter carriage from a first position in which the tilter rail is aligned with the rails of the first and second tray conveyor segments to a second position in which the tilter rail is out of alignment with the rails of the first and second tray conveyor segments.

8. A monorail conveyor as in claim 1 further comprising:
a carriage conveyor segment including a single carriage rail that houses a carriage linear-motor stator extending in the conveying direction along the length of the carriage conveyor segment to produce a traveling electromagnetic wave along the length of the carriage rail perpendicular to the rail of the tray conveyor segment;
a carriage including:
  a carriage platform supported on the top of the carriage rail;
  carriage side guides extending downward from the carriage platform and forming a carriage slot to receive the carriage rail;
  carriage coils housed in the carriage, wherein the carriage linear-motor stator forms a linear motor with the carriage coils that moves the carriage along the carriage rail;
  a single transfer rail attached to the carriage platform with a top that is positionable with the top of the rail in the tray conveyor segment to receive a tray from or discharge a tray to the tray conveyor segment;
  carriage drive coils housed in the transfer rail;
  a carriage controller inductively powered by the linear-motor stator through the carriage coils to drive the carriage drive coils to produce a traveling electromagnetic wave in the transfer rail that interacts with the magnets in the tray to propel the tray onto or off the transfer rail from or to the rail of the tray conveyor segment.

9. A monorail conveyor as in claim 8 comprising a plurality of the tray conveyor segments arranged in parallel on the same side or on opposite sides of the carriage conveyor segment so that the carriage can receive the tray from one of the tray conveyor segments and discharge the tray to another of the tray conveyor segments.

10. A monorail conveyor as in claim 8 comprising two of the tray conveyor segments arranged in parallel and two carriage conveyor segments arranged perpendicular to the two tray conveyor segments, wherein one of the carriage conveyor segments transfers the tray between the first ends of the two tray conveyor segments and wherein the other of the carriage conveyor segments transfers the tray between the second ends of the two tray conveyor segments.

11. A monorail conveyor as in claim 10 wherein the carriage conveyor segments are translator carriage segments and the rails of the two tray conveyor segments lie in the same horizontal plane.

12. A monorail conveyor as in claim 10 wherein the carriage conveyor segments are elevator carriage segments and the rails of the two tray conveyor segments lie in the same vertical plane.

13. A monorail conveyor as in claim 1 further comprising:
a plurality of the tray conveyor segments in which a first one of the tray conveyor segments extends obliquely from the first end of a second one of the tray conveyor segments across a gap;
a diverter carriage segment having a cylindrical diverter base housing a diverter stator;
a diverter carriage including:
  a diverter platform supported on the diverter base and having a side skirt extending downward around the periphery of the diverter base;
  diverter coils housed in the side skirt;
  a single diverter rail supported above the diverter platform to a top that is level with the tops of the rails in the first and second tray conveyor segments to receive a tray from or discharge a tray to the tray conveyor segments;
  diverter drive coils housed in the diverter rail;
a diverter controller driving the diverter stator to produce an electromagnetic wave that travels along the periphery of the diverter base and interacts with the diverter coils to rotate the diverter carriage from a first position in which the diverter rail is aligned with the rail of the first one of the tray conveyor segments to a second position in which the diverter rail is aligned with the rail of the second one of the tray conveyor segments.

14. A monorail conveyor as in claim 13 wherein the diverter carriage is inductively powered by the diverter stator and the diverter coils.

15. A monorail conveyor as in claim 7 wherein the tilter carriage is inductively powered by the tilter stator and the tilter coils.

16. A monorail conveyor as in claim 7 wherein the tilter rail tilts about an axis parallel to the conveying direction.

17. A monorail conveyor as in claim 1 wherein the tray conveyor segment includes electrically conductive material in the rail at the top of the rail and wherein the tray includes magnet material at the top of the slot so that movement of the tray along the length of the rail causes the magnet material to induce eddy currents in the electrically conductive material that produce a magnetic field that interacts with the magnet material to produce a levitation force on the tray.

18. A monorail conveyor as in claim 17 wherein the slot and the top of the rail are in the shape of an inverted U and wherein the electrically conductive material is a curved electrically conductive strip housed in the rail and extending along the length of the rail at the top and wherein the magnet material is a curved permanent magnet housed in the tray.

19. A monorail conveyor comprising:
a tray conveyor segment extending from a first end to a second end in a conveying direction and including:
a single rail housing a linear-motor stator extending in the conveying direction along the length of the tray conveyor segment to produce a traveling electromagnetic wave along the length of the rail;
a tray including:
a top platform;
a pair of side guides extending downward from the top platform and defining a slot in which the rail is received;
magnets in the side guides that interact with the traveling electromagnetic wave produced by the linear-motor stator to create a propulsive force that propels the tray along the length of the rail;
a scrubber including:
a scrubber body that rides on the rail;
a series of scrubber magnets housed in the scrubber body that interact with the traveling electromagnetic wave to propel the scrubber body along the rail;
a dispenser directing a cleansing solution onto the rail.

20. A monorail conveyor as in claim 19 wherein the scrubber further includes rotary scrub brushes that contact the top and the outer sides of the rail to scrub the rail.

21. A monorail conveyor comprising:
a carrier conveyor segment extending from a first end to a second end in a conveying direction and including:
a single rail having an upwardly convex curved top and two opposite outer sides extending downward from the upwardly convex curved top;
a carrier including a pair of downwardly extending side guides separated across a slot bounded by a top wall and facing side walls joined by the top wall to form the slot as an upwardly convex slot in which the rail is received with the side walls facing the outer sides of the rail;
a linear-synchronous motor including a linear-motor stator housed in the rail and a linear-motor forcer housed in the carrier to propel the carrier along the length of the rail.

22. A monorail conveyor as in claim 21 wherein the side walls of the carrier extend downward from the top wall far enough to form the slot deep enough to prevent the carrier from tilting about the conveying direction more than 5°.

23. A monorail conveyor as in claim 21 further comprising a levitation system including magnet material in the carrier and electrically conducting material in the rail to levitate the carrier as it is propelled in the conveying direction.

24. A monorail conveyor as in claim 23 wherein the electrically conductive material is a curved electrically conductive strip housed in the rail and extending along the length of the upwardly convex top of the rail and wherein the magnet material is a curved permanent magnet housed in the carrier at the top wall.

25. A monorail conveyor as in claim 21 wherein the linear-motor forcer is an array of magnets forming a linear synchronous motor with the linear-motor stator.

26. An endless monorail conveyor comprising:
two tray conveyor sections arranged in parallel and extending in length from first ends to second ends, each tray conveyor section having a monorail and a linear-motor stator housed in the monorail;
a tray having a slot receiving the monorails and a linear-motor forcer forming a linear motor with the linear-motor stator in the tray conveyor section to propel the tray along the monorails;
a first carriage conveyor section extending perpendicular to the two tray conveyor sections between the first ends and a second carriage conveyor section extending perpendicular to the two tray conveyor sections between the second ends, the first and second carriage conveyor sections each having a monorail and a linear-motor stator housed in the monorail;
a first carriage including:
a slot receiving the monorail of the first carriage conveyor section;
a linear-motor forcer forming a linear motor with the linear-motor stator in the first carriage conveyor section to propel the first carriage along the monorail of the first carriage conveyor section; and
a monorail extending perpendicular to the first carriage conveyor section;
a second carriage including:
a slot receiving the monorail of the second carriage conveyor section;
a linear-motor forcer forming a linear motor with the linear-motor stator in the second carriage conveyor section to propel the second carriage along the monorail of the second carriage conveyor section; and
a monorail extending perpendicular to the second carriage conveyor section;
wherein the first carriage conveyor section transfers the tray on the monorail of the first carriage between the first ends of the two tray conveyor sections and wherein the second carriage conveyor section transfers the tray on the monorail of the second carriage between the second ends of the two tray conveyor sections.

27. An endless monorail conveyor as in claim 26 wherein the monorails of the two tray conveyor sections lie in the same horizontal plane.

28. An endless monorail conveyor as in claim 26 wherein the monorails of the two tray conveyor sections lie in the same vertical plane.

29. An endless monorail conveyor as in claim 26 wherein the first and second carriages each include a rail stator in its monorail coupled to the linear-motor forcer, wherein the linear-motor stator in the carriage conveyor section is inductively coupled to the linear-motor forcer to power the rail stator through the linear-motor forcer.

* * * * *